US008814333B1

(12) United States Patent
Means et al.

(10) Patent No.: US 8,814,333 B1
(45) Date of Patent: Aug. 26, 2014

(54) OXYGEN IMPERMEABLE UMBILICALS FOR INK IN A PRINTER

(71) Applicant: Xerox Corporation, Norwalk, CT (US)

(72) Inventors: John David Means, Newberg, OR (US); Robert Mark Jacobs, Tigard, OR (US); Anthony Yeznach, Wilsonville, OR (US)

(73) Assignee: Xerox Corporation, Norwalk, CT (US)

(*) Notice: Subject to any disclaimer, the term of this patent is extended or adjusted under 35 U.S.C. 154(b) by 0 days.

(21) Appl. No.: 13/845,313

(22) Filed: Mar. 18, 2013

(51) Int. Cl.
*B41J 2/175* (2006.01)
*F16L 9/14* (2006.01)

(52) U.S. Cl.
CPC .................................... *B41J 2/175* (2013.01)
USPC ............................................ 347/85; 138/137

(58) Field of Classification Search
USPC ................. 347/7, 85; 138/137, 138, 141, 146
See application file for complete search history.

(56) References Cited

U.S. PATENT DOCUMENTS

| | | | | |
|---|---|---|---|---|
| 4,593,853 | A | 6/1986 | Schad et al. | |
| 4,710,413 | A | 12/1987 | Quack | |
| 5,148,193 | A | 9/1992 | Inamoto et al. | |
| 6,279,614 | B1 * | 8/2001 | Riesselmann et al. | 138/137 |
| 6,402,312 | B1 * | 6/2002 | Shekalim | 347/94 |
| 6,422,269 | B1 * | 7/2002 | Johansson et al. | 138/137 |
| 6,557,987 | B1 * | 5/2003 | Shibata et al. | 347/84 |
| 6,974,614 | B2 * | 12/2005 | Smith et al. | 428/35.9 |
| 7,281,547 | B2 * | 10/2007 | Cleveland et al. | 138/137 |
| 7,568,795 | B2 * | 8/2009 | Freitag et al. | 347/88 |
| 8,469,497 | B2 * | 6/2013 | Freitag et al. | 347/85 |
| 2013/0002773 | A1 | 1/2013 | Fujii et al. | |

* cited by examiner

*Primary Examiner* — Anh T. N. Vo
(74) *Attorney, Agent, or Firm* — Maginot, Moore & Beck, LLP

(57) ABSTRACT

A liquid ink delivery system for use in an inkjet printer includes a plurality of conduits. Each conduit is configured to deliver liquid ink from reservoirs to printheads. The conduits are essentially comprised of a first material which is non-reactive with the liquid ink and which does not facilitate cooling or congealing of the liquid ink as the ink passes through the conduits. The conduits also include coatings applied to the first material that have further properties suited to delivery of ink and additives within the liquid ink. In one embodiment, an oxygen impermeable coating is applied to the conduit to reduce the risk of the ink or an additive within the ink oxidizes during transport through the conduit.

18 Claims, 6 Drawing Sheets

OXYGEN IMPERMEABLE UMBILICALS FOR INK IN A PRINTER

TECHNICAL FIELD

This disclosure relates generally to machines that move thermally treated fluid from a supply through a conduit to a printhead.

BACKGROUND

The word "printer" as used herein encompasses any apparatus, such as a digital copier, book marking machine, facsimile machine, multi-function machine, etc., that produces an image with a colorant on recording media for any purpose. Printers that form an image on a surface of an image receiving member and then transfer the image to recording media are referenced in this document as indirect printers. Indirect printers typically use intermediate transfer, transfix, or transfuse members to facilitate the transfer and fusing of the image from the image receiving member to the recording media. In general, such printing systems typically include a colorant applicator, such as a printhead, that forms an image with colorant on the image receiving member. Recording medium is fed into a nip formed between the surface of the image receiving member and a transfix roller to enable the image to be transferred and fixed to the print medium so the image receiving member can be used for formation of another image.

In ink imaging systems having intermediate image receiving members, ink is loaded into the system and delivered through a conduit system as liquid ink to a printhead for jetting onto a surface of an image receiving member. The ink can be in the form of aqueous ink, pigment and dye resin based aqueous ink, MICR ink, UV ink, and solid ink. When the ink is solid phase change ink, the solid phase change ink is transported through a feed chute by a feed mechanism for delivery to a melting device. The melting device heats the solid ink so it melts and then is delivered through the conduit system. Regardless of the ink type, once in the conduit system, the liquid ink is maintained at a temperature that enables ejection of the ink by the inkjet ejectors in the printhead, while preserving sufficient tackiness to enable the ink to adhere to the surface of the image receiving member. Accordingly, to transport the liquid ink, the conduit system must be essentially comprised of a material which does not facilitate adhesion or congealing of the liquid ink. Additionally, because the liquid ink is heated to a high temperature, chemical reactions between the ink and the conduit system are able to occur more readily. Conduit systems for liquid ink delivery that address these issues are desirable.

SUMMARY

A conduit has been developed that transports liquid ink while attenuating or preventing chemical reactions with the conduit or substances seeping through the conduit. The conduit includes a body having a first end and a second end and a lumen extending through the body between the first end and the second end. The body is essentially comprised of a first material that is non-reactive with liquid ink. A first coating is applied to a surface of the body, and the first coating is essentially comprised of a second material that is impermeable to oxygen.

An ink umbilical assembly has been developed that transports liquid ink while attenuating or preventing chemical reactions with the assembly or substances seeping through a conduit in the assembly. The ink umbilical assembly includes a plurality of conduits essentially comprised of a first material that is non-reactive with liquid ink. The plurality of conduits has an outer surface. A coating is applied to the outer surface of the plurality of conduits, and the coating is essentially comprised of a second material that is impermeable to oxygen.

An inkjet printer has been developed that transports liquid while attenuating or preventing chemical reactions with a conduit in the printer or substances seeping through the conduit in the printer. The printer includes a printhead having a plate with a plurality of openings, a plurality of ink reservoirs, and an ink umbilical assembly. The ink umbilical assembly is configured to transport liquid ink from the plurality of ink reservoirs to the printhead. The ink umbilical assembly includes a plurality of conduits essentially comprised of a first material that is non-reactive with liquid ink. The plurality of conduits has an outer surface, and each conduit of the plurality of conduits has a first end configured to be coupled to the an ink reservoir of the plurality of ink reservoirs and a second end configured to be coupled to an opening of the plurality of openings. A first coating is applied to the outer surface of the plurality of conduits, and the coating is essentially comprised of a second material that is impermeable to oxygen.

BRIEF DESCRIPTION OF THE DRAWINGS

The foregoing aspects and other features of a conduit and an ink umbilical assembly for use in an inkjet printer to transport liquid ink are explained in the following description, taken in connection with the accompanying drawings.

DETAILED DESCRIPTION

Figure 6:
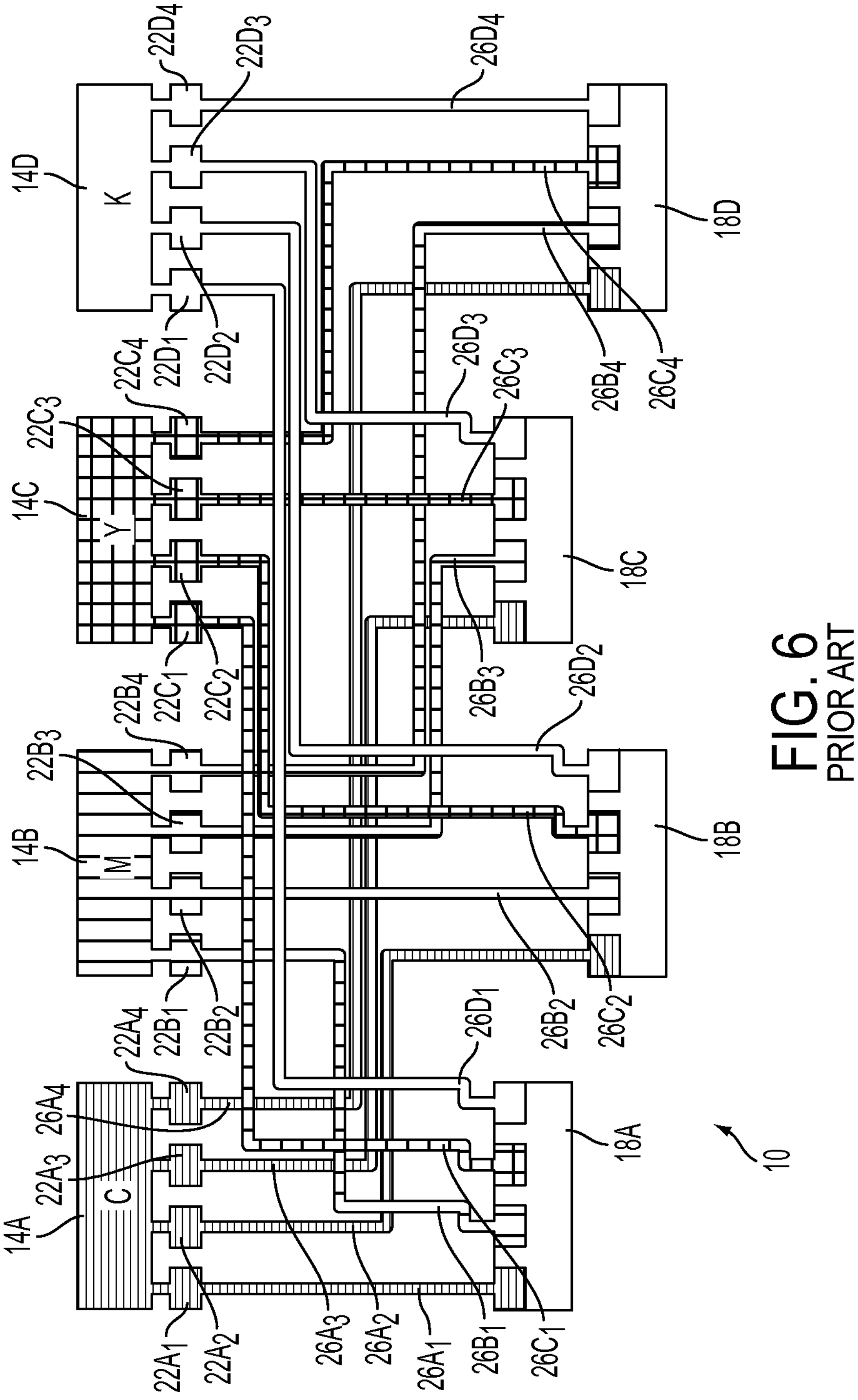
FIG. 6 PRIOR ART
FIG. 6 is a block diagram of connections for a prior art ink delivery system in an inkjet printer.

By way of example, a phase change ink printer 10 includes a liquid ink delivery system of the prior art as shown in FIG. 6. The printer 10, however, can alternatively be configured to print using aqueous ink, pigment and dye resin based aqueous ink, MICR ink, UV ink, and solid ink. The system 10 includes reservoirs 14A, 14B, 14C, and 14D, printheads 18A, 18B, 18C, and 18D, staging areas 22$A_{1-4}$, 22$B_{1-4}$, 22$C_{1-4}$, and 22$D_{1-4}$, and conduits 26$A_{1-4}$, 26$B_{1-4}$, 26$C_{1-4}$, and 26$D_{1-4}$. The term conduit as used herein refers to a body having a passageway through the body for transport of a liquid or a gas.

Each reservoir 14A, 14B, 14C, and 14D is configured to collect and retain liquid ink of a single color. As shown in FIG. 6, reservoir 14A contains cyan colored ink C, reservoir 14B contains magenta colored ink M, reservoir 14C contains yellow colored ink Y, and 14D contains black colored ink K. In alternative embodiments, liquid ink of other colors can be used. Each reservoir 14A, 14B, 14C, and 14D is coupled to each of the printheads 18A, 18B, 18C, and 18D via the staging areas 22$A_{1-4}$, 22$B_{1-4}$, 22$C_{1-4}$, and 22$D_{1-4}$, and conduits $26A_{1-4}$, $26B_{1-4}$, $26C_{1-4}$, and $26D_{1-4}$. The liquid ink delivery system shown in FIG. 6 includes four reservoirs and four printheads. In alternative embodiments, however, liquid ink delivery systems can include more or fewer reservoirs and printheads.

The liquid ink in the staging areas $22A_{1-4}$, $22B_{1-4}$, $22C_{1-4}$, and $22D_{1-4}$ is pressurized to facilitate delivery of the ink to a printhead 18A, 18B, 18C, or 18D. When a printhead 18A, 18B, 18C, or 18D needs additional ink, a valve is opened to enable ink from the respective staging area $22A_{1-4}$, $22B_{1-4}$, $22C_{1-4}$, or $22D_{1-4}$ to flow through the respective conduit $26A_{1-4}$, $26B_{1-4}$, $26C_{1-4}$, or $26D_{1-4}$ to the respective printhead 18A, 18B, 18C, or 18D. Accordingly, each printhead 18A, 18B, 18C, and 18D receives ink from each of the four reservoirs to enable each printhead to eject all four colors of ink, namely, black, cyan, magenta, and yellow.

The spatial relationships between the reservoirs 14A, 14B, 14C, and 14D and the printheads 18A, 18B, 18C, and 18D are not accurately depicted in the block diagram shown in FIG. 6. Instead, the reservoirs 14A, 14B, 14C, and 14D and the printheads 18A, 18B, 18C, and 18D are arranged in FIG. 6 to illustrate the connection points for the overlapping conduits $26A_{1-4}$, $26B_{1-4}$, $26C_{1-4}$, and $26D_{1-4}$. Thus, the actual distances between the reservoirs 14A, 14B, 14C, and 14D and printheads 18A, 18B, 18C, and 18D are longer than shown in 6. While independent conduits $26A_{1-4}$, $26B_{1-4}$, $26C_{1-4}$, and $26D_{1-4}$ like those shown in FIG. 6 are able to couple the reservoirs 14A, 14B, 14C, and 14D to each of the printheads 18A, 18B, 18C, and 18D effectively, such a configuration is inefficient in terms of space required for routing the conduits $26A_{1-4}$, $26B_{1-4}$, $26C_{1-4}$, and $26D_{1-4}$ and in terms of maintaining the particular environmental conditions important for the transportation of the liquid ink. For example, longer conduits, such as the conduit $26D_1$ between the black ink reservoir 14D and the printhead 18A, are sufficiently long that under some environmental conditions, the liquid ink can at least partially solidify in the conduit $26D_1$ as it is being transported from the reservoir 14D to the printhead 18A.

Figure 1:
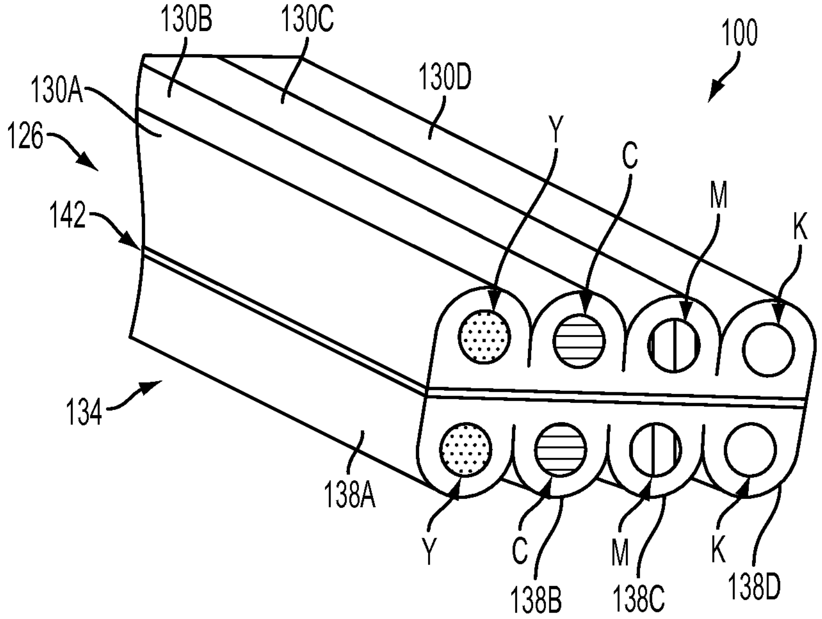
FIG. 1 is an enlarged perspective view of an ink umbilical assembly used in an ink delivery system.

Accordingly, to address these and other issues, as well as to provide conduits that are flexible and are attached to one another to allow relative motion for printer operation and reasonable service access, an ink umbilical assembly, such as the ink umbilical assembly 100 shown in FIG. 1 is used. The term "ink umbilical assembly" as used in this document means one or more pluralities of conduits that are assembled in association with a heater to maintain the ink in each plurality of conduits at a temperature different than the ambient temperature. The exemplary ink umbilical assembly 100 described in more detail below is flexible to enable relative movement between adjacent printheads and between printheads and reservoirs.

The ink umbilical assembly 100 shown in FIG. 1 includes a first plurality of conduits 126, which includes conduits 130A, 130B, 130C and 130D and a second plurality of conduits 134, which includes conduits 138A, 138B, 138C and 138D. Interposed between the first plurality of conduits 126 and the second plurality of conduits 134 is a heater 142. In at least one embodiment, each plurality of conduits 126, 134 is comprised of independent conduits coupled together to form a plurality so the conduits are generally parallel to one another along the length of the ink umbilical assembly 100. In at least another embodiment, each plurality of conduits 126, 134 is formed as a single structure, for example, by extrusion, as shown in FIG. 1. In at least one embodiment, the conduits 130A-D and 138A-D are substantially semi-circularly shaped to provide a relatively flat surface to facilitate joining the first and second pluralities of conduits 126, 134 to the heater 142. The resulting structure promotes heat transfer from the heater 142 into the conduits 130A-D and 138A-D and provides thermal mass around the heater 142 to improve heat spread to reduce the likelihood of hot spots on the first and second pluralities of conduits 126, 134. Thus, the arrangement of conduits 130A-D and 138A-D on both sides of the heater 142 results in greater efficiency of the heater 142.

Figure 2:
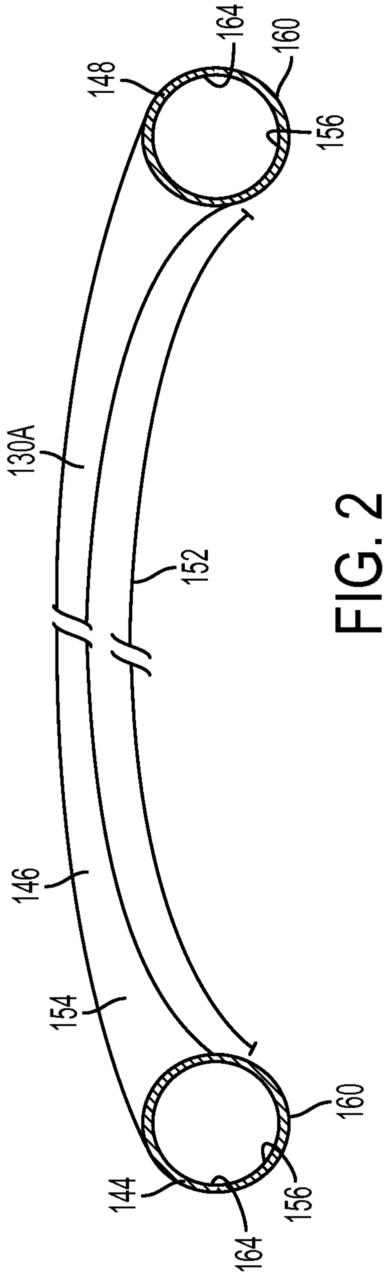
FIG. 2 is a schematic perspective view of a conduit configured for use in the ink umbilical assembly of FIG. 1.

Each of the conduits 130A-D and 138A-D are substantially similar to one another. Turning now to FIG. 2, conduit 130A, by way of example to represent each of the conduits 130A-D and 138A-D, is described in greater detail. The conduit 130A has a body 146 through which a lumen 164 extends. The body is formed in a tubular shape and has a first end 144, a second end 148, and a length 152 extending from the first end 144 to the second end 148. The body 146 of the conduit 130A is essentially comprised of a first material 154. The body 146 of the conduit 130A has an internal surface 156 and an opposite external surface 160, both of which extend along the length 152 of the conduit 130A from the first end 144 to the second end 148. The lumen 164 is the space adjacent to the internal surface 156 of the conduit 130A and is configured to transport liquid ink through the conduit 130A.

The first end 144 is coupled to one of the reservoirs 14A, 14B, 14C, or 14D (shown in FIG. 6) and the second end 148 is coupled to one of the printheads 18A, 18B, 18C, or 18D (shown in FIG. 6) such that when liquid ink is transported through the conduit 130A, the ink is transported from the reservoir to the printhead. The liquid ink and the conduit 130A are maintained at a temperature sufficient to allow the liquid ink to flow along the conduit 130A without cooling or congealing. The temperature to which the conduit is heated also facilitates reactions between chemicals contained in the ink and chemicals contained in the conduit 130A. Accordingly, the ink and the conduit 130A should be essentially comprised of materials which are not reactive with one another at the temperature at which the conduit 130A is typically maintained.

More specifically, ink is essentially comprised of specific chemicals to produce ink material having predetermined properties suited to the printing process. Chemicals added to the ink to result in predetermined properties are also known as additives. For example, some phase change inks are formulated with additives to cause the ink to have a predetermined melting temperature. Additionally, some inks are formulated with additives to cause each color of ink to have a predetermined hue. Additionally, some inks are formulated with additives to cause the ink to have a predetermined viscosity and tackiness such that the ink flows through the printing system and adheres to the print media. For example, the additive Sylvalite is added to ink to cause the ink to have a predetermined viscosity and tackiness when it is heated to a predetermined temperature. Some additives have chemical properties which make them more reactive or less reactive with other chemicals. For example, Sylvalite is reactive with oxygen such that exposure of Sylvalite to oxygen at an elevated temperature causes Sylvalite to oxidize, thereby changing the chemical and physical properties of the ink. Additionally, some additives are more difficult or less difficult and more expensive or less expensive to produce. Accordingly, the additives added to ink to cause the ink to have predetermined properties are selected based on their chemical properties as well as their cost.

Similarly, conduits are essentially comprised of specific chemicals that provide the conduit with predetermined properties suited to the printing process. For example, some conduits are essentially comprised of a material formulated with specific chemicals such that the conduits are non-reactive with the heated, liquid ink. Conduits can be essentially comprised of materials formulated with specific chemicals to make the conduit bodies non-reactive with additives included in the heated, liquid ink; impermeable to oxygen and other gases such as carbon dioxide; flexible; reduce the likelihood that the ink does not adhere to or congeal within the lumen; and impermeable to ink pigments or dyes. One or more of the specific chemicals can be used together or separately to impart one or more of these properties to the conduit provided the chemicals do not react adversely with one another. As used herein, ink pigments or dyes are colorant materials added to ink to impart a particular color hue to the ink.

To illustrate the importance of formulating the ink and the conduits with compatible materials, in one embodiment, by way of example, the first material of the conduits is essentially comprised of silicone and the ink includes the additive Sylvalite. Silicone is a desirable material to use for the first material of conduits because it produces conduits that are substantially flexible, that do not facilitate adhesion or congealing of the liquid ink within the lumen, and that are non-reactive with a large variety of chemicals, including Sylvalite. However, silicone is also highly permeable to oxygen. In alternative embodiments, perfluorinated ethers and perfluorinated hydrocarbon elastomers can be used for the first material of conduits. Sylvalite is a desirable chemical to use as an additive in phase change ink because it produces ink with a predetermined viscosity and tackiness at an elevated temperature and because it is inexpensive. However, Sylvalite is also reactive with oxygen such that exposure to oxygen at elevated temperatures changes the chemical and physical properties of the Sylvalite. Accordingly, when liquid ink including Sylvalite passes through the conduits essentially comprised of silicone, the Sylvalite does not react with the silicone in the conduits, but oxygen passes through the conduits and oxidizes the Sylvalite, thereby changing the chemical and physical properties of the ink. Accordingly, as described in more detail below, exemplary conduits further include at least one coating applied to the external surfaces. While the conduits can be used with a variety of ink types, they are especially useful for transporting melted phase change inks as these inks have additives that can be reactive than those found in other inks and the ink and additives are heated and maintained at temperatures that encourage chemical reactions.

Figure 3:
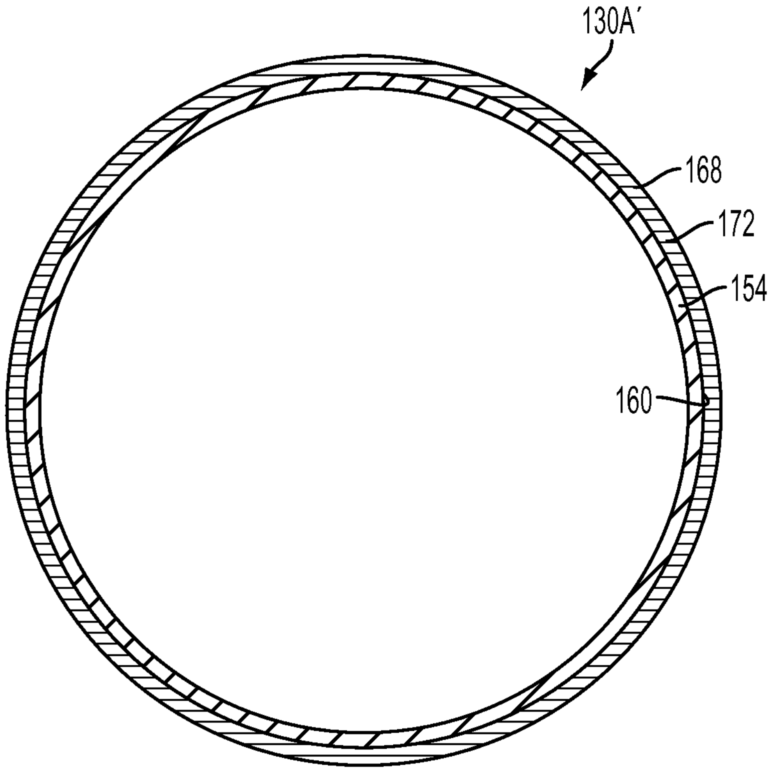
FIG. 3 is a schematic cross-sectional view of a conduit configured for use in the ink umbilical assembly of FIG. 1.

Shown in FIG. 3, the conduit 130A' is substantially similar to the conduit 130A (shown in FIG. 2). Both the conduit 130A and the conduit 130A' are essentially comprised of a first material 154. The conduit 130A' differs, however, from the conduit 130A in that the conduit 130A' includes a first coating 168 essentially comprised of a second material 172 applied to the external surface 160 of the conduit 130A'. The first material 154 is substantially flexible, does not facilitate adhesion or congealing of liquid ink, and is non-reactive with a large variety of materials. The second material 172 is substantially flexible and is impermeable to oxygen. The first material is, for example, silicone, and the second material is, for example, Viton. In alternative embodiments, Tedlar, Kynar, Saran, Teflon or other vapor deposited metals and polymers can be used as the second material. Applying the first coating 168 essentially comprised of a second material 172 that is impermeable to oxygen to the external surface 160 of the conduit 130A' essentially comprised of the first material 154 that is non-reactive with a large variety of materials, renders the conduit 130A' suitable for transporting a large variety of liquid inks. The first coating 168 on the conduit 130A' can be fabricated using coextrusion, flow coating, dipping, spraying, coating and/or painting.

More specifically, the conduit 130A' is rendered suitable for transporting inks including additives prone to oxidization. The ink including the oxidization prone additive does not react with the non-reactive first material 154 in the conduit 130A' and the oxygen impermeability of the second material 172 of the first coating 168 prevents oxygen from passing through the conduit 130A' thereby reducing the risk that the additive oxidizes. Accordingly, the first coating 168 increases the versatility of the conduit 130A' by rendering it suitable for transporting a greater variety of inks including inks having oxidization prone additives, some of which are relatively low cost additives.

In at least one embodiment, the first coating 168 is integrally formed with, rather than being applied to, the external surface 160 of the conduit 130A'. Integrally forming the first coating 168 with the external surface 160 achieves the same result as applying the first coating 168 to the external surface 160, but results in a single unitary piece essentially comprised of a homogenous material. This integration of the two materials is advantageous for ease of production of the ink umbilical assembly. In at least one embodiment, the homogenous material is polyvinylidene fluoride.

Figure 4:
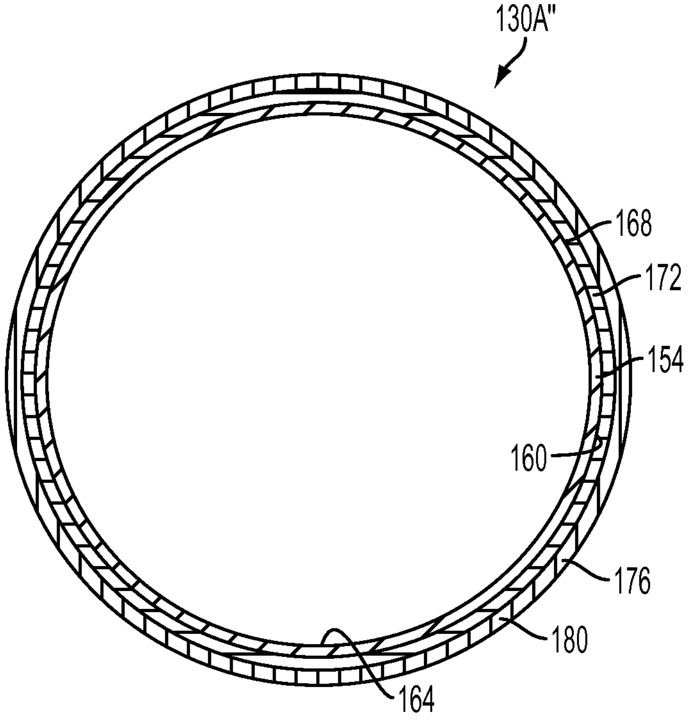
FIG. 4 is a schematic cross-sectional view of another conduit configured for use in the ink umbilical assembly of FIG. 1.

Shown in FIG. 4, the conduit 130A" is substantially similar to the conduit 130A' (shown in FIG. 3). Both the conduit 130A' and the conduit 130A" are essentially comprised of a first material 154 and include a first coating 168 essentially comprised of a second material 172 applied to the external surface 160 of the conduit 130A'. The conduit 130A" differs, however, from the conduit 130A' in that the conduit 130A" also includes a second coating 176 essentially comprised of a third material 180 applied to the first coating 168. The third material 180 is substantially flexible and is impermeable to pigments or dyes. Applying the second coating 176 essentially comprised of a third material 180 that is impermeable to pigments or dyes to the first coating 168 essentially comprised of the second material 172 that is impermeable to oxygen applied to the conduit 130A" essentially comprised of the first material 154 that is non-reactive with a large variety of materials, renders the conduit 130A" suitable for transporting a large variety of liquid inks. The first coating 168 and the second coating 176 on the conduit 130A" can be fabricated using coextrusion, flow coating, dipping, spraying, coating and/or painting.

More specifically, the conduit 130A" is rendered suitable for transporting liquid inks including additives prone to oxidization and pigments or dyes prone to migration through materials. The ink including the oxidization prone additive and migration prone pigments or dyes does not react with the non-reactive first material 154 in the conduit 130A" and the oxygen impermeability of the second material 172 of the first coating 168 prevents oxygen from passing through the conduit 130A" thereby preventing exposure of the oxidization prone additive to oxygen. Additionally, the pigment or dye impermeability of the third material 180 of the second coating 176 prevents pigments or dyes from passing through the conduit 130A" thereby reducing the risk of migration of the pigments or dyes out of the ink and/or into other adjacent conduits. Accordingly, the second coating 176 increases the versatility of the conduit 130A" by rendering the conduit 130A" suitable for transporting a greater variety of inks including inks having oxidization prone additives and having migration prone pigments or dyes, some of which are relatively low cost additives.

In this embodiment, the first coating 168 is interposed between the second coating 176 and the external surface 160 of the conduit 130A". This arrangement allows oxygen to permeate from outside the ink umbilical assembly 100

(shown in FIG. 1) through the second coating 176, but not through the first coating 168. Likewise, this arrangement allows pigments or dyes in the liquid ink to migrate from the liquid ink within the lumen 164 through the conduit 130A" and through the first coating 168, but not through the second coating 176.

In at least one embodiment, the second coating 176 is integrally formed with, rather than applied to, the first coating 168. Integrally forming the second coating 176 with the first coating 168 achieves the same result as applying the second coating 176 to the first coating 168, but results in a single unitary piece. This is advantageous for ease of production of the ink umbilical assembly 100 (shown in FIG. 1). The second coating 176 is able to be integrally formed with the first coating 168 whether the first coating is applied to or integrally formed with the conduit 130A".

Figure 5:
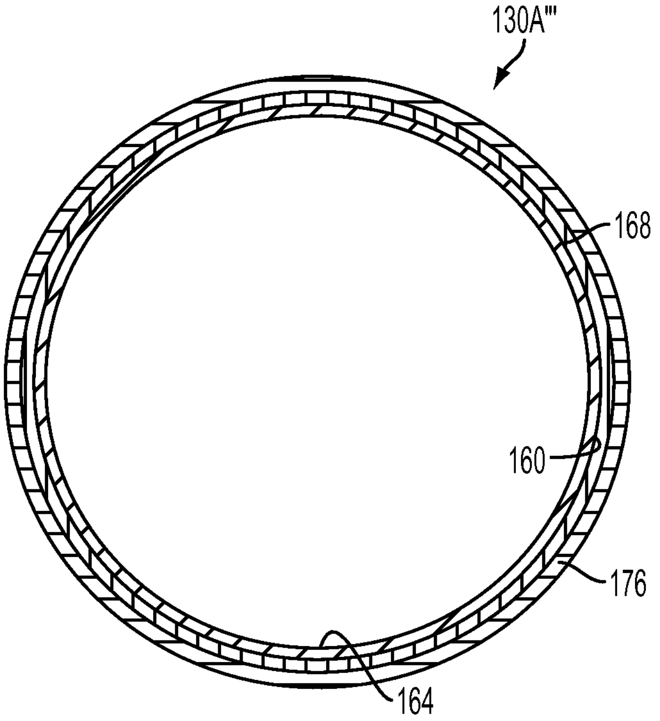
FIG. 5 is a schematic cross-sectional view of another conduit configured for use in the ink umbilical assembly of FIG. 1.

Shown in FIG. 5, the conduit 130A"' is substantially similar to the conduit 130A" (shown in FIG. 4). Both the conduit 130A" and the conduit 130A"' are essentially comprised of a first material 154, include a first coating 168 essentially comprised of a second material 172, and include a second coating 176 essentially comprised of a third material 180. The conduit 130A"' differs, however, from the conduit 130A" in that the second coating 176 is interposed between the first coating 168 and the external surface 160 of the conduit 130A"'. Interposing the second coating 176 between the first coating 168 and the external surface 160 of the conduit 130A"' achieves the same result as interposing the first coating 168 between the second coating 176 and the external surface 160 of the conduit 130A", but this arrangement prevents oxygen from permeating from outside the ink umbilical assembly 100 (shown in FIG. 1) through the first coating 168 and thus through the second coating 176. Likewise, this arrangement prevents pigments or dyes in the liquid ink from migrating from the liquid ink within the lumen 164 through the second coating 176 and thus through the first coating 168.

In at least one embodiment, the first coating 168 is integrally formed with, rather than applied to, the second coating 176. Integrally forming the first coating 168 with the second coating 176 achieves the same result as applying the first coating 168 to the second coating 176, but results in a single unitary piece. This is advantageous for ease of production of the ink umbilical assembly. The first coating 168 is able to be integrally formed with the second coating 176 whether the second coating 176 is applied to or integrally formed with the conduit 130A"'.

In at least one alternative embodiment, the conduit 130A, 130A', 130A", or 130A"' includes an additional coating or a number of additional coatings. An additional coating is essentially comprised of materials having additional properties suited to the printing process. In at least one other alternative embodiment, a coating or number of coatings, for example first coating 168 and second coating 176, are applied to the internal surface 156 of the conduit 130A, 130A', 130A", or 130A"' rather than the external surface 160. In this alternative embodiment, the coating(s) applied to the internal surface 156 are non-reactive with a large variety of chemicals and do not facilitate adhesion or congealing of the liquid ink.

It will be appreciated that some or all of the above-disclosed features and other features and functions or alternatives thereof, may be desirably combined into many other different systems, apparatus, devices, or applications. Various presently unforeseen or unanticipated alternatives, modifications, variations, or improvements therein may be subsequently made by those skilled in the art, which are also intended to be encompassed by the following claims.

What is claimed is:

1. A conduit for transporting liquid ink comprising:
a body having a first end and a second end;
a lumen extending through the body between the first end and the second end, the body being essentially comprised of a first material that is non-reactive with liquid ink; and
a first coating applied to a surface of the body, the first coating essentially comprised of a second material that is impermeable to oxygen, the first coating and the surface of the body being integrally formed and essentially comprise homogenous material.

2. The conduit of claim 1 wherein the homogenous material is polyvinylidene difluoride.

3. The conduit of claim 1 further comprising:
a second coating essentially comprised of a third material that is impermeable to dye, the second coating integrally formed with the first coating and the body.

4. A conduit for transporting liquid ink comprising:
a body having a first end and a second end;
a lumen extending through the body between the first end and the second end, the body being essentially comprised of a first material that is non-reactive with liquid ink;
a first coating applied to a surface of the body, the first coating essentially comprised of a second material that is impermeable to oxygen; and
a second coating essentially comprised of a third material that is impermeable to dye, the second coating integrally formed with the body.

5. A conduit for transporting liquid ink comprising:
a body having a first end and a second end;
a lumen extending through the body between the first end and the second end, the body being essentially comprised of a first material that is non-reactive with liquid ink;
a first coating applied to a surface of the body, the first coating essentially comprised of a second material that is impermeable to oxygen; and
a second coating essentially comprised of a third material that is impermeable to dye, the first coating interposed between the second coating and the outside surface of the body.

6. A conduit for transporting liquid ink comprising:
a body having a first end and a second end;
a lumen extending through the body between the first end and the second end, the body being essentially comprised of a first material that is non-reactive with liquid ink;
a first coating applied to a surface of the body, the first coating essentially comprised of a second material that is impermeable to oxygen; and
a second coating essentially comprised of a third material that is impermeable to dye, the second coating interposed between the first coating and the outside surface of the body.

7. The conduit of claim 6 further comprising:
a second coating essentially comprised of a third material that is impermeable to dye, the body, the first coating, and the second coating being flexible.

8. The conduit of claim 6 wherein the first material is silicone.

9. The conduit of claim 6 wherein the second material is Viton.

10. An ink umbilical assembly for transporting liquid ink to a printhead comprising:

a plurality of conduits essentially comprised of a first material that is non-reactive with liquid ink, the plurality of conduits having an outer surface; and a coating applied to the outer surface of the plurality of conduits, the coating essentially comprised of a second material that is impermeable to oxygen, the first coating and the surface of the conduit are integrally formed and essentially comprise a homogenous material.

11. The ink umbilical assembly of claim 10 wherein the homogenous material is polyvinylidene difluoride.

12. An ink umbilical assembly for transporting liquid ink to a printhead comprising:

a plurality of conduits essentially comprised of a first material that is non-reactive with liquid ink, the plurality of conduits having an outer surface;

a first coating applied to the outer surface of the plurality of conduits, the first coating essentially comprised of a second material that is impermeable to oxygen; and a second coating essentially comprised of a third material that is impermeable to dye, the second coating integrally formed with the first coating.

13. An ink umbilical assembly for transporting liquid ink to a printhead comprising:

a plurality of conduits essentially comprised of a first material that is non-reactive with liquid ink, the plurality of conduits having an outer surface;

a first coating applied to the outer surface of the plurality of conduits, the first coating essentially comprised of a second material that is impermeable to oxygen; and a second coating essentially comprised of a third material that is impermeable to dye, the second coating integrally formed with the plurality of conduits.

14. An ink umbilical assembly for transporting liquid ink to a printhead comprising:

a plurality of conduits essentially comprised of a first material that is non-reactive with liquid ink, the plurality of conduits having an outer surface;

a first coating applied to the outer surface of the plurality of conduits, the first coating essentially comprised of a second material that is impermeable to oxygen; and a second coating essentially comprised of a third material that is impermeable to dye, the first coating interposed between the second coating and the outer surface of the plurality of conduits.

15. An ink umbilical assembly for transporting liquid ink to a printhead comprising:

a plurality of conduits essentially comprised of a first material that is non-reactive with liquid ink, the plurality of conduits having an outer surface;

a first coating applied to the outer surface of the plurality of conduits, the first coating essentially comprised of a second material that is impermeable to oxygen; and a second coating essentially comprised of a third material that is impermeable to dye, the second coating interposed between the first coating and the outer surface of the plurality of conduits.

16. The ink umbilical assembly of claim 15 further comprising:

a second coating essentially comprised of a third material that is impermeable to dye, the plurality of conduits, the first coating, and the second coating being flexible.

17. The ink umbilical assembly of claim 15 wherein the first material is silicone.

18. The ink umbilical assembly of claim 15 wherein the second material is Viton.

* * * * *